United States Patent
Pino, Jr.

(10) Patent No.: US 9,485,468 B2
(45) Date of Patent: Nov. 1, 2016

(54) SYSTEM, METHOD AND DEVICE FOR PROVIDING COMMUNICATIONS

(71) Applicant: Angelo J. Pino, Jr., New York, NY (US)

(72) Inventor: Angelo J. Pino, Jr., New York, NY (US)

(*) Notice: Subject to any disclaimer, the term of this patent is extended or adjusted under 35 U.S.C. 154(b) by 178 days.

(21) Appl. No.: 14/149,039

(22) Filed: Jan. 7, 2014

(65) Prior Publication Data
US 2014/0192479 A1     Jul. 10, 2014

Related U.S. Application Data

(60) Provisional application No. 61/749,977, filed on Jan. 8, 2013, provisional application No. 61/824,164, filed on May 16, 2013.

(51) Int. Cl.
*H04N 7/173*     (2011.01)
*H04Q 1/02*     (2006.01)

(52) U.S. Cl.
CPC ............... *H04N 7/173* (2013.01); *H04Q 1/025* (2013.01)

(58) Field of Classification Search
CPC ....................................................... H04N 7/173
USPC ................................................ 725/119–120
See application file for complete search history.

(56) References Cited

U.S. PATENT DOCUMENTS

| | | | | |
|---|---|---|---|---|
| 5,727,055 A * | 3/1998 | Ivie | ...................... | H01R 13/518 379/156 |
| 6,157,377 A * | 12/2000 | Shah-Nazaroff | ... | H04N 7/17318 348/E7.071 |
| 6,317,881 B1 * | 11/2001 | Shah-Nazaroff | ....... | H04H 60/33 348/E7.075 |
| 6,795,552 B1 * | 9/2004 | Stanush | ................. | H04Q 1/028 379/399.01 |
| 6,823,064 B1 * | 11/2004 | Korman | ................. | H04Q 1/142 379/333 |
| 6,898,413 B2 * | 5/2005 | Yip | ......................... | H04W 8/28 379/399.01 |
| 7,477,285 B1 * | 1/2009 | Johnson | ................ | G06F 19/327 348/143 |
| 9,191,083 B1 * | 11/2015 | Rao | ....................... | H04B 7/0413 |
| 2004/0163128 A1 * | 8/2004 | Phillips | ............... | H04L 65/1036 725/120 |
| 2006/0139489 A1 * | 6/2006 | Lee | ......................... | H04N 7/106 348/515 |
| 2007/0263852 A1 * | 11/2007 | Schley-May | ........... | H04L 12/10 379/413 |
| 2008/0313691 A1 * | 12/2008 | Cholas | ............... | H04N 21/4147 725/131 |
| 2010/0095334 A1 * | 4/2010 | Shah-Nazaroff | ... | H04N 7/17318 725/100 |
| 2010/0173594 A1 * | 7/2010 | Stettler | .................. | H04B 1/715 455/77 |
| 2011/0038637 A1 * | 2/2011 | Rao | ......................... | G06F 3/023 398/115 |
| 2011/0211584 A1 * | 9/2011 | Mahmoud | ........... | H04L 12/2834 370/401 |
| 2011/0310213 A1 * | 12/2011 | Garcia | ............. | H04M 3/42042 348/14.05 |

(Continued)

OTHER PUBLICATIONS

Blue Box, Coax/Fiber Transceiver, pp. 1-3, copyright 2013. http://www.cobaltdigital.com/sites/default/files/downloads/BB-E00E-IS%28V1.2%29.pdf.

(Continued)

*Primary Examiner* — David Warren
(74) *Attorney, Agent, or Firm* — Jeffrey S. Melcher; Manelli Selter PLLC

(57) ABSTRACT

Provided are a system, method and device for providing communications to a multiple dwellings.

6 Claims, 5 Drawing Sheets

(56) References Cited

U.S. PATENT DOCUMENTS

| | | | | |
|---|---|---|---|---|
| 2011/0318012 | A1* | 12/2011 | Lonn | H04B 10/25751 398/115 |
| 2012/0185187 | A1* | 7/2012 | Parakulam | H04Q 9/00 702/63 |
| 2013/0088987 | A1* | 4/2013 | Preschutti | H04B 3/46 370/252 |
| 2014/0026201 | A1* | 1/2014 | Srinivasan | G06Q 50/01 726/7 |
| 2014/0192479 | A1* | 7/2014 | Pino, Jr. | H04Q 1/025 361/679.45 |
| 2014/0280702 | A1* | 9/2014 | Barker | H04N 21/2402 709/217 |
| 2015/0049864 | A1* | 2/2015 | Faulkner | H04M 3/085 379/22.03 |
| 2015/0264437 | A1* | 9/2015 | Biewer | H04N 21/4622 725/64 |
| 2015/0289121 | A1* | 10/2015 | Lesage | G08B 25/006 455/404.1 |
| 2015/0311951 | A1* | 10/2015 | Hariz | H04W 88/16 375/257 |
| 2015/0333794 | A1* | 11/2015 | Casey | G08B 27/005 379/93.06 |
| 2015/0334594 | A1* | 11/2015 | Stephens | H04W 28/0268 705/14.64 |

OTHER PUBLICATIONS

Suttle, Multi-Dwelling Unit Fiber Deployment, copyright 2009, pp. 1-6. http://www.ospmag.com/files/pdf/whitepaper/MDU_Fiber_WhitePaper.pdf.

Calix, Multi-Dwelling Unit ONTs, copyright 2014, p. 1. http://www.calix.com/systems/p-series/calix_mdu_ONTs.html.

Adtran, Total Acess 380 Multi-Dwelling Unit (MDU) ONT, copyright 2014, p. 1. http://www.adtran.com/web/appmanager/portal/Adtran?_nfpb=true&partNumber=1187773G1&productGroupId=669&selectTab=documentation&_pageLabel=waverunner_page_products_productdetail.

* cited by examiner

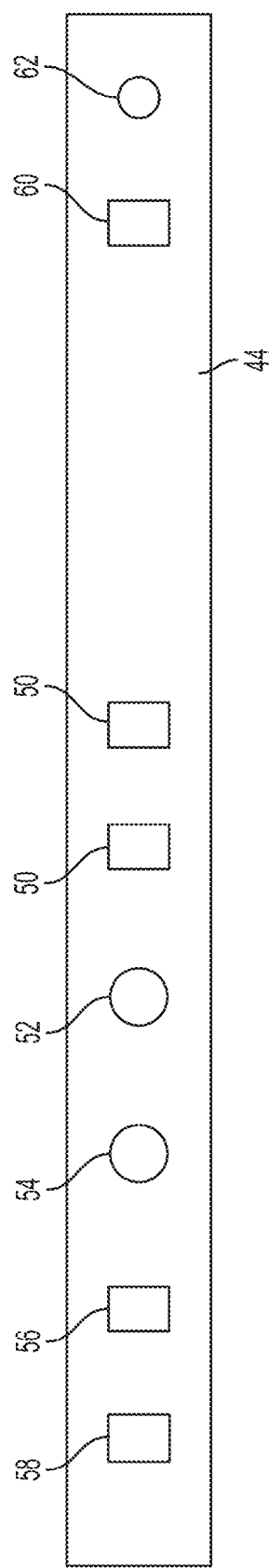

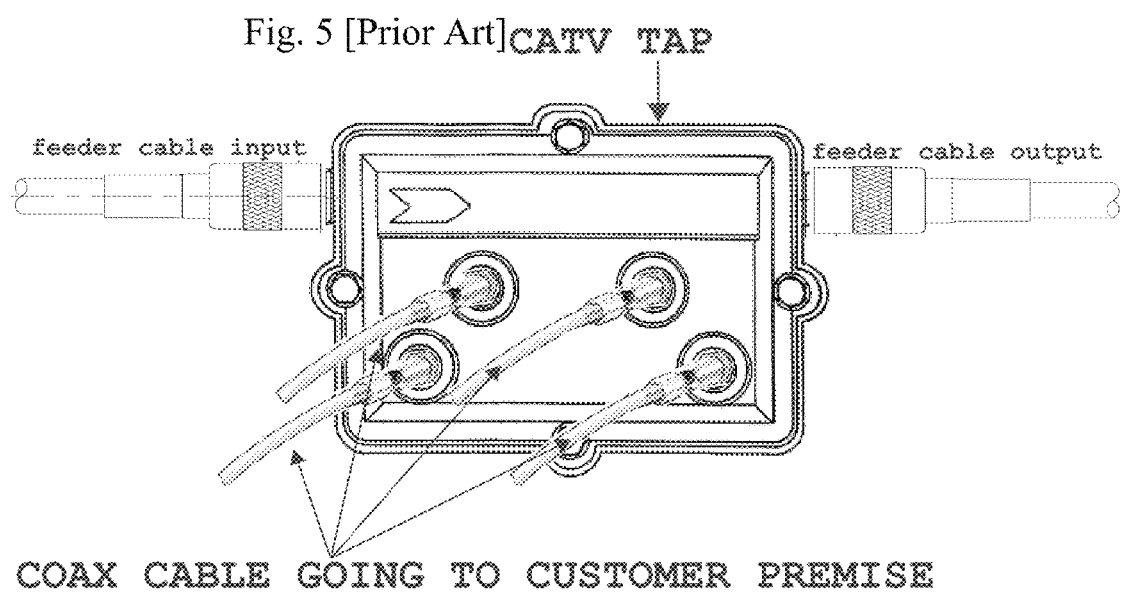
Fig. 5 [Prior Art]

SYSTEM, METHOD AND DEVICE FOR PROVIDING COMMUNICATIONS

FIELD OF THE INVENTION

The present invention generally relates to communications, and more particularly to a system, method and device for providing communications to a multiple dwellings.

BACKGROUND OF THE INVENTION

Communication providers face various challenges in supplying communications services to dwellings in existing buildings such as office building and apartment buildings. For example, a fiber optic medium provider may wish to service the building and provide fiber to each unit (office or dwelling). Specifically, in many buildings it may cost prohibitive and/or impractical to run fiber to each unit. In addition, owners of some units may want fiber and others may not. Consequently, there is a need for a device that provides an interface between a variety of existing media in the building and an new media providing communication services to the building.

These features and advantages of the present invention will become more fully apparent from the following description and appended claims, or may be learned by the practice of the invention as set forth hereinafter.

SUMMARY OF THE INVENTION

An objective of the invention is to provide a device that provides an interface between a variety of existing media in the building and a new media providing communication services to the building.

A further objective of the invention is to provide a device that connects an optical fiber feeder to existing connections for multiple dwellings, including but not limited to copper, coax, wireless, and optical.

Another objective of the invention is to eliminate the coax and copper feeder cables.

The above objective and other objectives are obtained by a device for providing communications to a plurality of units of a building, comprising:

an enclosure;

a plurality of circuit cards disposed in said enclosure and with each circuit card being associated with one of the plurality of units;

a fiber port disposed in said housing and communicatively coupled to each of the plurality of circuit cards;

wherein said fiber port is configured to receive telephone signals, data signals RF, analog, digital, wireless, WiFi, MiFi, WiMAx, and television signals;

wherein each circuit card comprises:

an upstream port (edge connector) configured to receive telephone signals, data signals, RF, analog, digital, wireless and television signals from said fiber port;

a coaxial port configured to communicate signals over a coaxial cable;

a twisted pair port configured to communicate signals over a twister pair conductor; and a processor configured to receive to receive telephone signals, data signals, RF, analog, digital, wireless and television signal; from the fiber port and wherein said processor is configurable to provide the telephone signals to the twisted pair port and to provide the data signals and the television signals to the coaxial cable port.

BRIEF DESCRIPTION OF THE DRAWINGS

FIG. 4 illustrates a circuit card; and

FIG. 5 [Prior Art] illustrates an existing CATV TAP.

DETAILED DESCRIPTION OF ILLUSTRATIVE EMBODIMENTS

Figure 1:
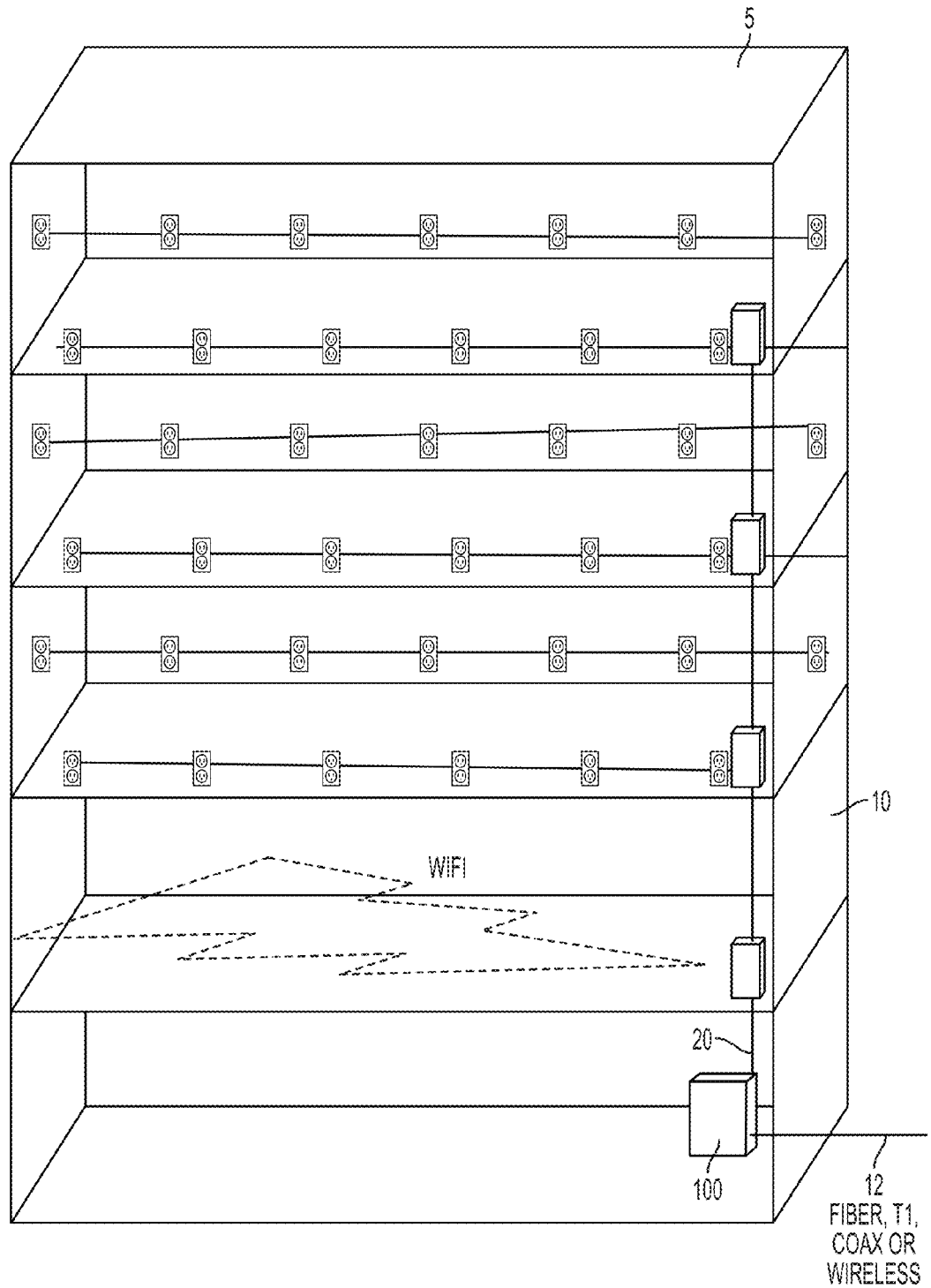
FIG. 1 illustrates a multi-unit building having a total of five floors with a device of an example embodiment of the present invention being located on the bottom floor.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention with reference to the attached non-limiting Figures.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

The present invention includes a system, method and device for connecting a fiber optic feeder cable—referred to collectively as feeder line—that supplies one or more signal types, such as television (TV), data (e.g., internet access), and telephone (fixed wireline or cellular), to a plurality of units (offices or dwellings) in a multi-unit building. In some example embodiments, the device may be used to connect a new feeder line to existing internal wiring (twisted pair, coaxial cable, etc.). In addition or alternatively, the device can be used to connect a feeder line to a wifi, local network, telephone network, or any other desired connection within the building. The invention can also be used to supply a neighborhood. For example, if coax is already connected to an existing neighborhood, the coax can be connected to the cards in the box and an optical fiber can be inputted into the box so that coax does not have to be replaced saving considerable time and expense. In this manner the box can be placed on a telephone pole or near an optical fiber connection so that and optical fiber input can be connected to the multiple existing coax cables.

Specifically, in many buildings it may be cost prohibitive and/or impractical to run fiber to each unit. In addition, the various owners of units may want to purchase services that require different drop connections (i.e., the wiring (twisted pair, fiber, coax, etc.) that connects the unit to the feeder line). In addition, it may be more economical to use an existing drop connection (e.g., twisted pair) for some services (e.g., telephone). For example, one dwelling unit may purchase only telephone service (which may employ a twisted pair drop connection), another dwelling unit may purchase telephone and television service (which may employ a coaxial cable or coax cable and twisted pair drop connection), and yet another dwelling unit may purchase only internet access (which may employ a fiber conductor or coaxial cable drop connection). Embodiments of the present invention may be used to service buildings to supply service to units using any of various media including twisted pair, coaxial cable, fiber optics, CAT-5 (Ethernet), and/or others.

FIG. 1 illustrates a multi-unit building 5 having a total of five floors with a device 100 of an example embodiment of the present invention being located on the bottom floor, which may be a basement. The building 5 also includes a lobby 10 on the first floor. The second through fourth floors include units such as dwelling units or offices (not shown). The device 100 receives a feeder line 12 which in this example comprises a fiber conductor feeder 12 but in other embodiments may comprise coaxial cable, a T1 line, a wireless feed or other connection. In addition, the device 100 is also connected to a plurality of drop lines 20 wherein each drop line connects the device 100 to a different unit.

As discussed, some units may have a pre-existing drop line 20 that is different from one or more (or all) other units. The following table lists the different drop lines 20 that may extend to each unit and the data carried thereon, referred to herein as the configuration of each circuit. It is worth noting that some embodiments of the present invention may have an output configuration that corresponds to every possible permutation of circuit configuration (including where only, one or two signal types are output). Other embodiments may include output configurations for only a subset of permutations such as all or some of those in the following table. As used in the table, "Phone" refers to conventional telephone service, "TV" refers to conventional digital television service and "Data" refers to information other than conventional telephone service data and digital TV data such as internet data, VoIP data, cellular service, WiFi, MiFi, etc.

| Configuration | Coax | Twisted Pair | Fiber |
| --- | --- | --- | --- |
| 1 | None | None | None |
| 2 | TV, Data (e.g., internet) | Phone | None |
| 3 | TV, Data, Phone | None | None |
| 4 | TV | Data, Phone | None |
| 5 | TV | None | Data Phone |
| 6 | None | None | TV, Data, Phone |
| 7 | TV | Phone | Data |
| 8 | TV | Data | Phone |
| 9 | None | Phone | TV, Data |
| 10 | Data | Phone | TV |
| 11 | TV | Phone | None |
| 12 | None | Phone | TV |
| 13 | None | Phone | Data |
| 14 | TV | None | None |
| 15 | None | None | Data |
| 16 | TV | None | Data |
| 17 | None | Phone | None |

For configurations in which some signals are output via fiber, the dwelling (or office) unit may include an optical network terminal to convert the fiber signals into electrical, RF, analog, digital, or wireless signals for distribution to the appropriate user device (e.g., router, modem, set top box, TV, computer, phone, VoIP ATA adapter, cable card, etc.). For configurations in which some signals are output via coax, the dwelling unit may include an cable modem or set top box (or other device) to convert the signals to the appropriate format for distribution to the appropriate user device (TV, computer, modem, phone, VoIP ATA adapter, router, etc.). For configurations in which some signals are output via twisted pair, the dwelling unit may include a device to convert the signals to the appropriate format for distribution to the appropriate user device (TV, computer, phone, VoIP ATA adapter, router, etc.).

Figure 2:
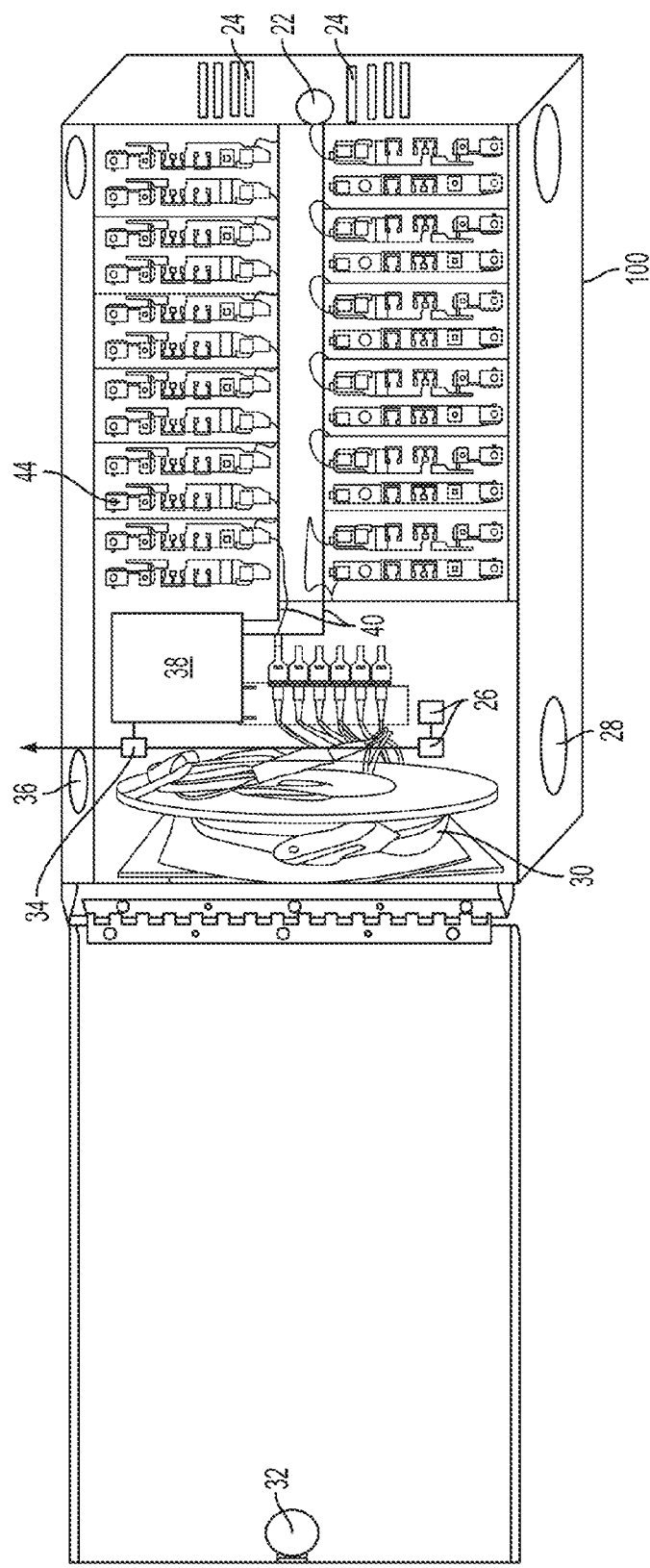
FIG. 2 illustrates a device according to the present invention.

One example embodiment of a device 100 according to the present invention is illustrated in FIGS. 2 and 4 and includes a plurality of circuit cards 44 that are insertable or fixed into an enclosure. Each circuit card 44 may provide communications services to one or more respective unit(s) of the building. As illustrated in FIG. 4, each circuit card may have one or more of the following: an Ethernet port 58, a fiber optic port 56, a coaxial out port 54, and one or more twisted pair ports 50 for connection to a drop line that is connected to a device in the respective unit(s). In addition, each card 44 may include a coax in port 52, a test port 60, and a power in port 62 that may facilitate debugging and testing of the circuit card. The circuit card 44 includes a plurality of edge connectors that interface with a connection of the housing to connect the circuit card to circuitry in the housing (e.g., connected to or forming part of the backplane). When installed in the housing, power can supplied from the housing.

In addition, one or more data signals (e.g., TV, Data, Phone) enter the circuit card 44 from the housing. In one example embodiment, the feeder into the housing is a fiber optic cable and circuitry in the housing converts the fiber data signals to electrical signals RF, analog, digital, or wireless. The converted electrical signals are supplied to each circuit card 44 which extracts (filters or routes) the appropriate data to the appropriate output port(s) of the circuit card for conduction to the unit. Thus, the circuit card 44 may have a router (level 3), switch (level 2), or processor for ensuring that only the appropriate data is passed on to the unit. Depending on the network one or more signals could pass out of a single port and distribute to various devices in the dwelling or common space In another example embodiment, the feeder into the housing is a coax carrying DOCSIS signals and the housing circuitry in the housing filters out the Phone and Data signals, which may be supplied to the appropriate edge connector of the circuit cards. The TV data may be supplied to each circuit card 44, which may pass along the TV data if the user of its respective unit is a subscriber or not perform filtering (and let the set top box perform filtering). Thus, the converted electrical, RF, analog, digital, or wireless signals are supplied to each circuit card which extracts (filters or routes) the appropriate data to the appropriate output port(s) of the circuit card for conduction to the unit. Thus, the circuit card 44 may have a router (level 3), switch (level 2), or processor for ensuring that only the appropriate data is passed on to the unit.

Alternately, whether DOCSIS or fiber, the housing circuitry may include an analog (or digital) filter, router, switch and/or processor to distribute only a portion of the data to each circuit card. For example, cable TV data may be passed on to all of the circuit cards 44, which may perform additional filtering/routing to pass on the cable TV data only if the unit is a subscriber (or may conduct all TV data). The housing circuitry may route internet data only to the circuit card 44 whose MAC address corresponds to the destination address of the subscriber (in the data packet). Each phone data (signals) may remain in analog form and be conducted from the housing circuitry to a designated edge connector of one circuit card to be amplified and provided to the Voice port (e.g., twisted pair) for conduction to the unit. The housing circuitry may include appropriate circuits (bandpass filters) to filter the voice signals for each unit. Alternately, phone data may be digital and routed/switched (e.g., addressed) like internet data to the appropriate circuit card 44 and converted to analog signals by the card 44 or a device in the unit.

Each circuit may be programmed with configuration data (by receiving such data from a network operations center and storing the data) to is used by a processor on the card 44 to determine how to handle the received data. Based on that configuration data, in either embodiment, for some units only one port of its respective circuit may be used (e.g., coax out to transmit both Phone, TV and Data), and for another unit other ports may be used (e.g., fiber and twisted pair to carry Data and Phone, respectively).

Each circuit card and the housing circuitry can be configured to facilitate bi-direction communications for TV (e.g., to facilitate Video on demand, pay per view purchasing, interactive TV), Phone, and Data. The housing also includes a power supply for supplying power to the circuit cards.

The device can be powered as desired using any conventional powering means, for example, but not limited to standard AC, 120V, 240V, DC power, power over Ethernet, power over twisted pair copper, power via transformers, batteries, generators, solar cells, and wind. If desired, the device can include a battery backup to power the device in the event of a power outage. For example, back feed power from a unit located inside the customers home (modem, power over Ethernet switch, set top box, etc.) can be utilized to allow the individual cards to be turned up and powered once the devices are activated inside the unit, instead of powering all cards together. The power can be sent over a coax, copper cable or any cable that can carry current strong enough to power the individual card.

The enclosure can have a lock 32 for locking the door to the enclosure, power connection lug 34, enclosure entry/exit 28 and 36, power supply 38, cooling fan 22, and side vents 24, and a power rail that can tie into ONT rail system to power each card 44 as it is installed in the enclosure which can be grounded to main power supply location in accordance with State, local or federal electrical codes. The ONT cards 44 can be slid into the rail system and locked down with screws that are secured to the ONT card 44 faceplate or the cards can be permanently fixed into the unit. The enclosure can further have a fiber tail coiled on reel 30 to be installed back to collector or hub location. The enclosure can have a waterproof seal insuring no water can enter the enclosure. The lock 32 can be constructed to automatically lock the enclosure once the door is shut.

Figure 3:
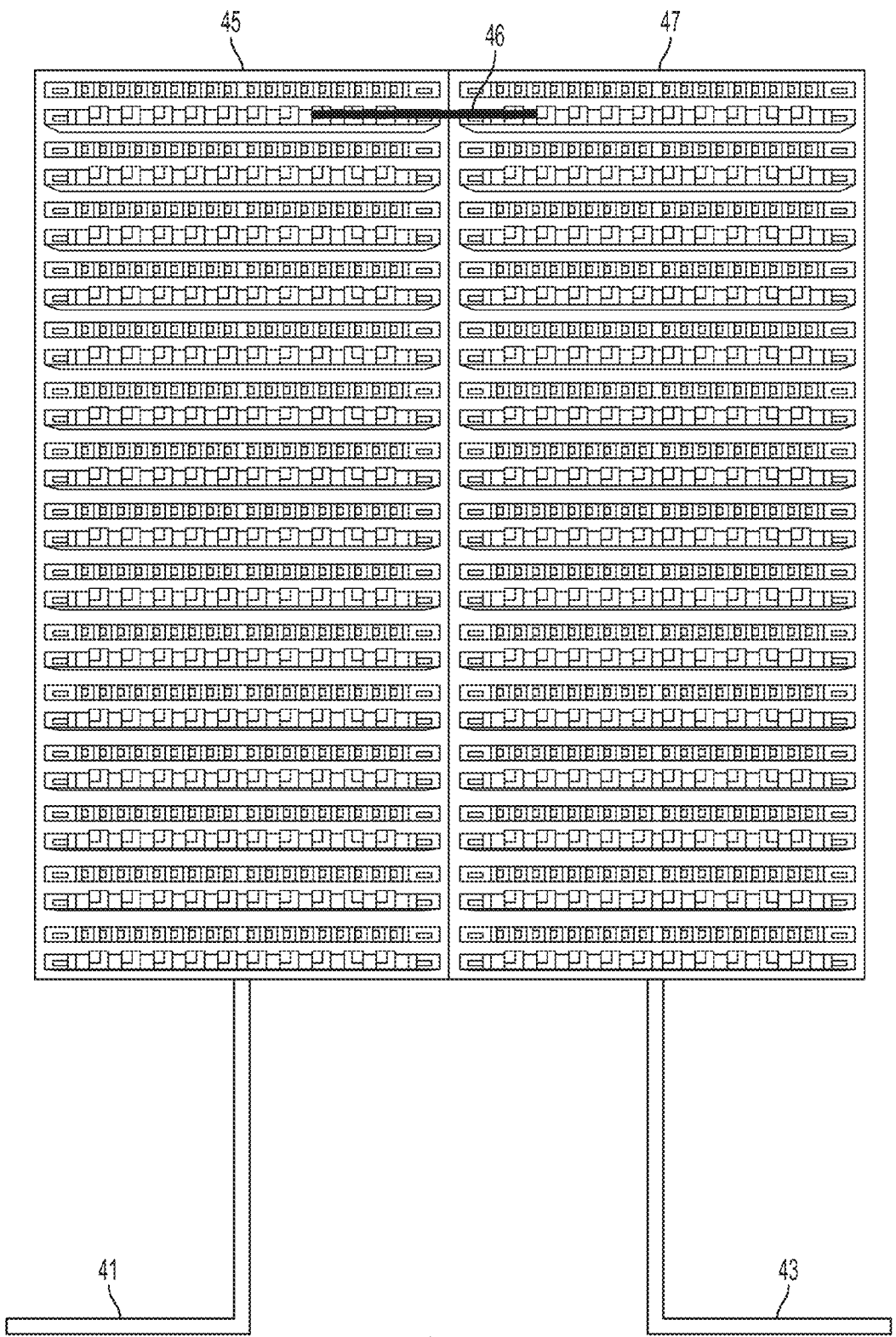
FIG. 3 [Prior Art] illustrates a device according to the present invention having a plurality of circuit cards that are either insertable or fixed into an enclosure.

FIG. 3 [Prior Art] shows an existing voice and or data cross connect block with a copper twisted pair cable 41 connected to the various punch down terminals on the cable block 45. The cable block 45 of punch down terminals and copper cable 41 on the left is called the feeder trunk. That cable block 45 provides the input signal for the buildings voice and data lines. The cable 43 and punch down terminals of block 47 on the right is called the riser or house cable. The riser or house cable 43 and block 47 connect to all of the units in the dwelling. Presently, in order to supply voice and or data to the units a twisted pair jumper 46 is connected from the relevant punch down terminal on feeder trunk block 45 to the relevant punch down terminal on the riser block 47, thus distributing the signal to a phone, modem, set top box or other communication device in the particular dwelling.

The present invention eliminates the twisted pair feeder cable 43 and block 45, which can now be replaced with the fiber conversion device. The conversion device will allow one to take fiber feed and distribute signal from the card 44 directly to a punch down terminal on the block 47 to supply any desired service to the dwellings using the existing internal wiring 43 within the building. For example, a copper twisted pair cable will be plugged into either the Ethernet or twisted pair outlets shown in FIG. 4 and the other end of the cable can be punched down/terminated onto the appropriate riser cross connect of block 47 of FIG. 3.

If desired, the device can have one or multiple carriers distribute services through the same device. For example, Verizon, time warner and RCN could each bring fiber from their hub to the device. The device can have one or multiple inputs allowing the different carriers to provide various services to the dwelling units. In FIG. 2, the spool of fiber on the left can have one or multiple fiber cables allowing multiple service providers to distribute their services. Furthermore, each individual card can have a toggle switch or some type of button that would allow the technician to select their pre-determined toggle position "A"=Verizon, "B"=RCN, or "C"=Cablevision, etc. Alternatively, the cards can be constructed to handle one or more carriers at the same time. For example, the card can be made as a dual or triple carrier device so if a customer wanted Cablevision for Video and Verizon for internet, the card can easily be programmed to provide such.

Any commercially available ONT's commonly used by any cable or telecommunications companies (MSO's) providing services over an optical fiber network can be modified and used in the present invention. Specific examples of suitable ONT's are the 1100 Series ONT by Tellabs, www.tellabs.com, which can be modified to be used in the present invention. For example, the outputs of the convention ONT can be made into a card with the outputs located as shown in FIG. 4.

FIG. 5 shows a conventional CATV TAP distribution tap that allows multiple dwellings (customers) to receive cable television service. The main feeder brings service to the CATV TAP. The main feeder output can continues to distribute service to other pieces of equipment in a building, block or neighborhood. In some cases the output is terminated because there is no need to reason to distribute services past that last point (e.g. when you reach the top floor of a building). The present invention will eliminate the CATV TAP and feeder cables (input and output). The service provider can take the coax cable off of the existing CATV TAP and install the coax cable on the coax port of the cards 44. In the event a coax drop does not exist or is damaged, a new drop can be installed and connected directly to the coax port on the cards 44.

The present invention is also suitable for use over a DAS, Distributed Antenna System. An example of a DAS is a shopping mall where the mall owner installs an antenna system covering all cell phone bands (cellular, PCS, AWS, LTE, etc.) and allows system operators to connect their equipment for a monthly fee. This is done frequently, for example at Yankee Stadium. The box or boxes can be installed at a location(s) which is predetermined by the building owner and service providers. To provide a signal to the box, an optical fiber can be spliced into the input of unit in order to provide one or multiple services. Coax, copper, or fiber can then be tied into the individual converter cards and the cables can be distributed throughout the building to various antennas allowing service to be provided customers.

The present invention is also suitable for use with a system proposed by Times Fiber in the early 1980's with the objective of reducing signal theft in MDUs. A cable operator would bring coax from the street to a rack of converters, one or two per unit. Fiber cables would be run from a converter output to each television. The box at the TV would convert the light back to a TV channel and also transmit the tuning request to the converter. This system prevents signal theft.

The box or boxes can be installed at a location(s) which is predetermined by the building owner and service providers. To provide a signal to the box, an optical fiber can be spliced into the input of unit in order to provide one or multiple services. Coax, copper, or fiber can then be tied into the individual cards and run into the customer's home. If there is existing cable inside of the customer premise and it is in good working condition, the cable can be utilized thus saving the service provider time and materials for the installation portion of the job.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A device for providing communications to a plurality of units of a building, comprising:
    an enclosure;
    a plurality of circuit cards disposed in said enclosure and with each circuit card being associated with one of the plurality of units; and
    a fiber port disposed in said housing and communicatively coupled to each of the plurality of circuit cards, wherein said fiber port is configured to receive telephone signals, data signals RF, analog, digital, wireless, WiFi, MiFi, WiMAx, or television signals;
    wherein each circuit card comprises:
    an upstream port (edge connector) configured to receive telephone signals, data signals, RF, analog, digital, wireless, WiFi, MiFi, WiMAx, or television signals from said fiber port;
    a coaxial port configured to communicate signals over a coaxial cable;
    a twisted pair port configured to communicate signals over a twister pair conductor; and
    a processor configured to receive telephone signals, data signals, RF, analog, digital, wireless, WiFi, MiFi, WiMAx or television signal; from the fiber port and wherein said processor is configurable to provide the telephone signals to the twisted pair port and to provide the data signals and the television signals to the coaxial cable port.

2. The device of claim 1, further comprising:
    a power supply for supplying power to the plurality of circuit cards;
    a fan for moving air in the enclosure;
    one or more vents in the enclosure; and
    a lockable enclosure door.

3. The device of claim 1, wherein each circuit card further comprises:
    an Ethernet port in communication with said processor;
    a test port in communication with said processor; and
    a fiber port in communication with said processor, wherein said processor is configurable to provide the telephone signals, the data signals RF, analog, digital, wireless, WiFi, MiFi, WiMAx or the television signals to fiber port.

4. The device of claim 1, wherein said processor is configurable to provide the telephone signals to the twisted pair port and to not provide the data signals RF, analog, digital, wireless, WiFi, MiFi, WiMAx or the television signals to the coaxial cable port.

5. The device of claim 1, wherein each circuit card comprises a memory storing configuration data used by said processor to determine what data received by said upstream port to supply to said coaxial port and said twisted pair port.

6. A device for providing communications to a plurality of units of a building, comprising:
    an enclosure;
    a plurality of circuit cards disposed in said enclosure and with each circuit card being associated with one of the plurality of units; and
    a first fiber port disposed in said housing and communicatively coupled to each of the plurality of circuit cards, wherein said first fiber port is configured to receive telephone signals, data signals RF, analog, digital, wireless, WiFi, MiFi, WiMAx, or television signals, wherein each circuit card comprises:
    an upstream port (edge connector) configured to receive telephone signals, data signals, RF, analog, digital, wireless, WiFi, MiFi, WiMAx, or television signals from said first fiber port;
    a coaxial port configured to communicate signals over a coaxial cable;
    a twisted pair port configured to communicate signals over a twister pair conductor;
    a second fiber port for transmitting a signal over a fiber connected to the second fiber port;
    a wireless transmitter configured to transmit a wireless signal; and
    a processor configured to receive telephone signals, data signals, RF, analog, digital, wireless, WiFi, MiFi, WiMAx or television signal from the first fiber port and wherein said processor is configurable to provide the telephone signals to the twisted pair port and to provide the data signals and the television signals to the coaxial cable port, said processor is configurable to provide at least one of the telephone signals, data signals, or television signals to the second optical port or wireless port, said processor is configurable to provide the telephone signals to the twisted pair port and to not provide the data signals RF, analog, digital, wireless, WiFi, MiFi, WiMAx or the television signals to the coaxial cable port, each circuit card comprises a memory storing configuration data used by said processor to determine what data received by said first optical port to supply to the coaxial port, twisted pair port, second fiber port or wireless transmitter.

* * * * *